US010625618B2

(12) United States Patent
Forssell et al.

(10) Patent No.: US 10,625,618 B2
(45) Date of Patent: Apr. 21, 2020

(54) DUAL VOLTAGE UNIT FOR A VEHICLE

(71) Applicant: VOLVO CAR CORPORATION, Gothenburg (SE)

(72) Inventors: Jonas Forssell, Torslanda (SE); Petter Almhagen, Partille (SE); Robert Eriksson, Halta (SE); Jonas Sjogren, Gothenburg (SE); Peter Bengtsson, Gothenburg (SE); Tobias Stalfors, Gothenburg (SE); Jan Muller, Save (SE); Anders Belfrage, Gothenburg (SE); Axel Vanerhav, Lerum (SE); Andreas Eriksson, Molndal (SE)

(73) Assignee: VOLVO CAR CORPORATION, Gothenburg (SE)

( * ) Notice: Subject to any disclaimer, the term of this patent is extended or adjusted under 35 U.S.C. 154(b) by 110 days.

(21) Appl. No.: 15/970,183

(22) Filed: May 3, 2018

(65) Prior Publication Data

US 2018/0319287 A1 Nov. 8, 2018

(30) Foreign Application Priority Data

May 4, 2017 (EP) .................................... 17169455

(51) Int. Cl.
*B60L 58/18* (2019.01)
*B60L 11/18* (2006.01)
(Continued)

(52) U.S. Cl.
CPC ........... *B60L 11/1866* (2013.01); *B60L 1/003* (2013.01); *B60L 3/0046* (2013.01); *B60L 15/007* (2013.01);
(Continued)

(58) Field of Classification Search
CPC ...... B60L 11/1866; B60L 50/66; B60L 58/14; B60L 3/0046; B60L 58/22; B60L 58/20;
(Continued)

(56) References Cited

U.S. PATENT DOCUMENTS 6,377,021 B2 * 4/2002 Duerbaum ........... H05K 5/0247
320/107
7,301,247 B2 * 11/2007 Kishibata ................ H02J 1/102
307/29
(Continued)

FOREIGN PATENT DOCUMENTS

| DE | 102013219965 A1 | 4/2015 | |
| DE | 102015218178 A1 * | 3/2017 | .............. B60L 50/15 |
| DE | 102015218178 A1 | 3/2017 | |

OTHER PUBLICATIONS

Merriam-Webster, "hermetic" pp. 1-3 (Year: NA) (Year: NA) (Year: NA).*

(Continued)

*Primary Examiner* — Pinping Sun
(74) *Attorney, Agent, or Firm* — Brooks Kushman P.C.

(57) ABSTRACT

A voltage supply unit for a vehicle is described, the voltage supply unit having a first output adapted to supply a first voltage to a first load and a second output adapted to supply a second voltage to a second load. The second voltage is obtained by a DC/DC converter powered by the first voltage, where the low voltage side of the DC/DC converter is connected to the second output and the high voltage side of the DC/DC converter is connected to the first output. Two different voltages can thereby be supplied by the use of one battery.

11 Claims, 3 Drawing Sheets

(51) Int. Cl.
*B60R 16/033* (2006.01)
*F02N 11/08* (2006.01)
*B60W 20/15* (2016.01)
*B60L 15/00* (2006.01)
*B60L 58/13* (2019.01)
*B60L 1/00* (2006.01)
*B60L 50/64* (2019.01)
*B60L 58/26* (2019.01)
*B60L 50/16* (2019.01)
*B60L 58/20* (2019.01)
*B60L 58/22* (2019.01)
*B60L 3/00* (2019.01)
*B60L 58/14* (2019.01)
*B60L 50/60* (2019.01)
*H01M 10/42* (2006.01)
*H01M 2/10* (2006.01)
*H01M 10/613* (2014.01)
*H01M 10/6551* (2014.01)
*H01M 10/44* (2006.01)
*H01M 10/625* (2014.01)
*H01M 10/6563* (2014.01)
*H01M 10/6554* (2014.01)

(52) U.S. Cl.
CPC .............. *B60L 50/16* (2019.02); *B60L 50/64* (2019.02); *B60L 50/66* (2019.02); *B60L 58/13* (2019.02); *B60L 58/14* (2019.02); *B60L 58/18* (2019.02); *B60L 58/20* (2019.02); *B60L 58/22* (2019.02); *B60L 58/26* (2019.02); *B60R 16/033* (2013.01); *B60W 20/15* (2016.01); *F02N 11/087* (2013.01); *F02N 11/0862* (2013.01); *F02N 11/0866* (2013.01); *H01M 2/1077* (2013.01); *H01M 10/425* (2013.01); *H01M 10/441* (2013.01); *H01M 10/613* (2015.04); *H01M 10/625* (2015.04); *H01M 10/6551* (2015.04); *H01M 10/6554* (2015.04); *H01M 10/6563* (2015.04); *B60L 2210/10* (2013.01); *B60L 2210/12* (2013.01); *B60L 2210/14* (2013.01); *B60L 2240/547* (2013.01); *B60L 2240/549* (2013.01); *F02N 11/0814* (2013.01); *F02N 2011/0888* (2013.01); *H01M 2220/20* (2013.01)

(58) Field of Classification Search
CPC .......... B60L 50/16; B60L 58/26; B60L 50/64; B60L 58/18; B60L 1/003; B60L 58/13; B60L 15/007; B60L 2210/12; B60L 2240/547; B60L 2210/14; B60L 2240/549; B60L 2210/10; H01M 10/6554; H01M 10/6563; H01M 10/625; H01M 10/441; H01M 10/6551; H01M 10/613; H01M 2/1077; H01M 10/425; H01M 2220/20; B60W 20/15; F02N 11/087; F02N 11/0866; F02N 11/0814; F02N 2011/0888; F02N 11/0862; H02M 3/00; B60R 16/02; B60R 16/033
See application file for complete search history.

(56) References Cited

U.S. PATENT DOCUMENTS

| | | | | |
|---|---|---|---|---|
| 7,962,222 | B2 * | 6/2011 | He .................. | A61N 1/08 607/61 |
| 8,242,748 | B2 * | 8/2012 | Burlak ............. | H02H 3/12 307/10.1 |
| 8,766,597 | B2 * | 7/2014 | Nork ............... | B60L 11/1866 320/118 |
| 8,884,582 | B2 * | 11/2014 | DeFrank .......... | H01M 10/4207 320/112 |
| 2003/0067287 | A1 * | 4/2003 | Morgen ........... | H02J 1/08 323/273 |
| 2004/0130214 | A1 * | 7/2004 | Murty ............. | H02J 7/1423 307/66 |
| 2005/0216131 | A1 * | 9/2005 | Sodemann ....... | H02G 3/00 700/295 |
| 2006/0018069 | A1 * | 1/2006 | Gull ................ | H02J 3/005 361/90 |
| 2006/0110655 | A1 * | 5/2006 | Wirdel ............. | B60L 3/003 429/61 |
| 2007/0182369 | A1 * | 8/2007 | Gerber ............. | H02J 7/0042 320/112 |
| 2011/0241421 | A1 * | 10/2011 | Schaefer .......... | H02J 1/08 307/9.1 |
| 2012/0249058 | A1 * | 10/2012 | Kuraishi .......... | H02J 7/342 320/107 |
| 2014/0183939 | A1 * | 7/2014 | Jiang ............... | B60L 58/18 307/9.1 |
| 2015/0008734 | A1 * | 1/2015 | Ishida ............. | B60R 16/033 307/10.1 |
| 2015/0298631 | A1 * | 10/2015 | Belger ............. | B60R 16/033 307/10.1 |
| 2017/0036545 | A1 * | 2/2017 | Lopez De Arroyabe ............. | B60L 1/00 |
| 2017/0158062 | A1 * | 6/2017 | Emrani ............ | B60L 58/14 |

OTHER PUBLICATIONS

European Patent Office, Partial European Search Report for related Application No. EP17169455, dated Jan. 22, 2018, 16 pages.

* cited by examiner

DUAL VOLTAGE UNIT FOR A VEHICLE

CROSS-REFERENCE TO RELATED APPLICATIONS

This application claims foreign priority benefits under 35 U.S.C. § 119(a)-(d) to European patent application number EP 17169455.7, filed May 4, 2017, which is incorporated by reference in its entirety.

TECHNICAL FIELD

The present disclosure relates to a dual voltage unit for a vehicle, which is adapted to supply a higher and a lower voltage to the electrical components of the vehicle.

BACKGROUND

Vehicles comprising an internal combustion engine are subjected to a plurality of different legislative requirements and regulations. Some of these requirements and regulations are directed to fuel consumption and exhaust emission. Different countries or markets may have different requirements. One measure that is used to reduce fuel consumption is to provide the vehicle with a start/stop function, which allows the combustion engine to be shut off when the vehicle is stopped, e.g. at a traffic light or in a queue.

Due to the start/stop function, a larger and more powerful battery is required in order to be able to run the starter motor more often. The start/stop function may also, especially in cold weather conditions, cause a voltage drop below e.g. 10.5 volts, which may be considered as the minimum allowable voltage for the electrical system of the vehicle. A voltage above 10.5 volts is required to ensure that all electronic control units function properly. Instead of using one larger and more powerful battery, this problem is often solved by using a second smaller auxiliary battery that will only power the electrical system of the vehicle during start of the engine, such that the voltage drop of the starter battery does not affect the electrical system.

In modern cars, the packing situation in the engine compartment is such that the battery does not fit in the engine compartment, which used to be the regular place for the battery. Normally, the main battery is placed at the rear of the vehicle, and the auxiliary support battery is placed at the front of the vehicle, e.g. in the engine compartment. This requires long and thick cables to transfer the needed current to and from the main battery.

In order to reduce the electrical losses, it is becoming more and more common to use an additional 48 volt system for the high current components of the vehicle, e.g. for the starter motor. The 48 volt battery is also placed at the rear of the vehicle, together with the main battery, while the high current loads are positioned mainly at the front of the vehicle. The high current loads include e.g. the starter motor, the servo motor for the power steering and the automatic brake system. These loads will require a high current and also a high peak current.

There is thus room for an improved voltage supply unit for a vehicle.

SUMMARY

An object of the disclosure is therefore to provide an improved voltage supply unit adapted to supply more than one voltage to an electric system of a vehicle. A further object of the disclosure is to provide an improved voltage supply unit comprising air cooling.

The solution to the problem according to the disclosure is described in the characterizing part of claim 1 regarding the voltage supply unit, in claim 11 regarding the vehicle and in claim 13 regarding the method. The other claims contain advantageous further developments of the inventive voltage supply unit and the vehicle. The claims also contain a computer program and a computer program product for performing such a method.

In a voltage supply unit for a vehicle, provided with a first output adapted to supply a first voltage to a first load and provided with a second output adapted to supply a second voltage to a second load, the object of the disclosure is achieved in that the second voltage is obtained by a DC/DC converter powered by the first voltage, where the low voltage side of the DC/DC converter is connected to the second output and the high voltage side of the DC/DC converter is connected to the first output.

By this first embodiment of a voltage supply unit according to the disclosure, a voltage supply unit having two different output voltages is provided, where the lower voltage is obtained from a DC/DC converter powered by the higher voltage. In this way, it is possible to provide two different supply voltages to the electrical system of a vehicle from a single battery. There are several advantages of having a single battery in a voltage supply unit. Space is one advantage. A single battery requires less space than two or three different batteries, which allows for a more compact packing of the voltage supply unit. It will thus be possible to fit the voltage supply unit at the front of the vehicle, in the engine compartment. A further advantage is the reduction of power losses. Shorter power cables means less power loss compared with a conventional solution with the batteries at the rear of the vehicle. This will further reduce the weight and the cost of the power cables and of the system.

In one example, the vehicle is provided with a higher supply voltage of 48 volts and a lower, regular supply voltage of 12 volts. In normal driving conditions, the battery will supply the higher voltage, e.g. 48 volts, to the high voltage loads of the vehicle. A DC/DC converter will supply the lower voltage, e.g. 12 volts, to the low voltage loads of the vehicle. The DC/DC converter is powered by the battery. An electric machine functioning as a generator charges the 48 volt battery. The electric machine may also be used as an electric motor to drive the vehicle or to help to accelerate the vehicle when starting to drive.

The battery is adapted to supply 48 volts to the high voltage loads and to the DC/DC converter. In normal conditions, there is thus no need for a separate 12 volt battery. In some cases, the DC/DC converter will not have time to regulate the output voltage when a high current peak is drawn from the 12 volt output. If the required current exceeds the nominal current output from the DC/DC converter, the DC/DC converter will further not be able to regulate the output voltage to 12 volts. An example of a high peak current may e.g. be when the electric power steering motor starts. The high peak current may cause the low voltage to drop below a predefined voltage security level, which may be e.g. 10.5 volts, before the DC/DC converter can regulate the output voltage. Below this voltage security level, the electronic control units of the vehicle may not function properly and may e.g. stop, reset or output false values. It is thus important that the output voltage is never below the voltage security level.

The battery comprises a plurality of battery cells arranged in series. By using some of the battery cells as a low voltage battery pack, it is possible to deliver a high peak current to the lower voltage load. This low voltage battery pack is connected to the low voltage output before or at the same time as a high current load is activated. In this way, the peak current drawn by the low voltage high current load can be delivered by the low voltage battery pack, which ensures that the output voltage will not drop below the voltage security level. When the peak current has been delivered and the DC/DC converter is stable, the battery pack can be disconnected.

The voltage supply unit is further provided with a switch that is adapted to disconnect part or the complete high voltage load from the battery, if the high voltage load draws too much current. This is to ensure that the battery can always deliver enough current to the DC/DC converter such that the low voltage loads can be supplied. Since the security systems run on the low voltage, it is important that the low voltage system is prioritized.

In a method for supplying electric energy to an electric system of a vehicle, the steps of: supplying a first voltage to a first load connected to a first output from a battery, supplying a second voltage to a second load connected to a second output from a DC/DC converter connected to the battery, and connecting a second battery pack, comprised in the battery, to the second output when a predefined additional load is connected to the second output are comprised.

By this first embodiment of the method, the method will be able to supply two different voltages to a vehicle electric system from a single battery pack. Part of the battery pack is used as an auxiliary battery in order to be able to supply high peak currents to the low voltage load. In this way, it can be ensured that the low voltage is always above a predefined voltage security level. By this method, there is no need to use more than one battery. This will save space, weight and will reduce power losses since there is no need to use long power cables to the rear of the vehicle.

BRIEF DESCRIPTION OF THE DRAWINGS

The present disclosure will now be described in more detail, with reference to the appended drawings showing example embodiments, wherein.

DETAILED DESCRIPTION

As required, detailed embodiments are disclosed herein. However, it is to be understood that the disclosed embodiments are merely exemplary and that various alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The embodiments of the disclosure with further developments described in the following are to be regarded only as examples and are in no way to limit the scope of the protection provided by the patent claims.

Figure 1:
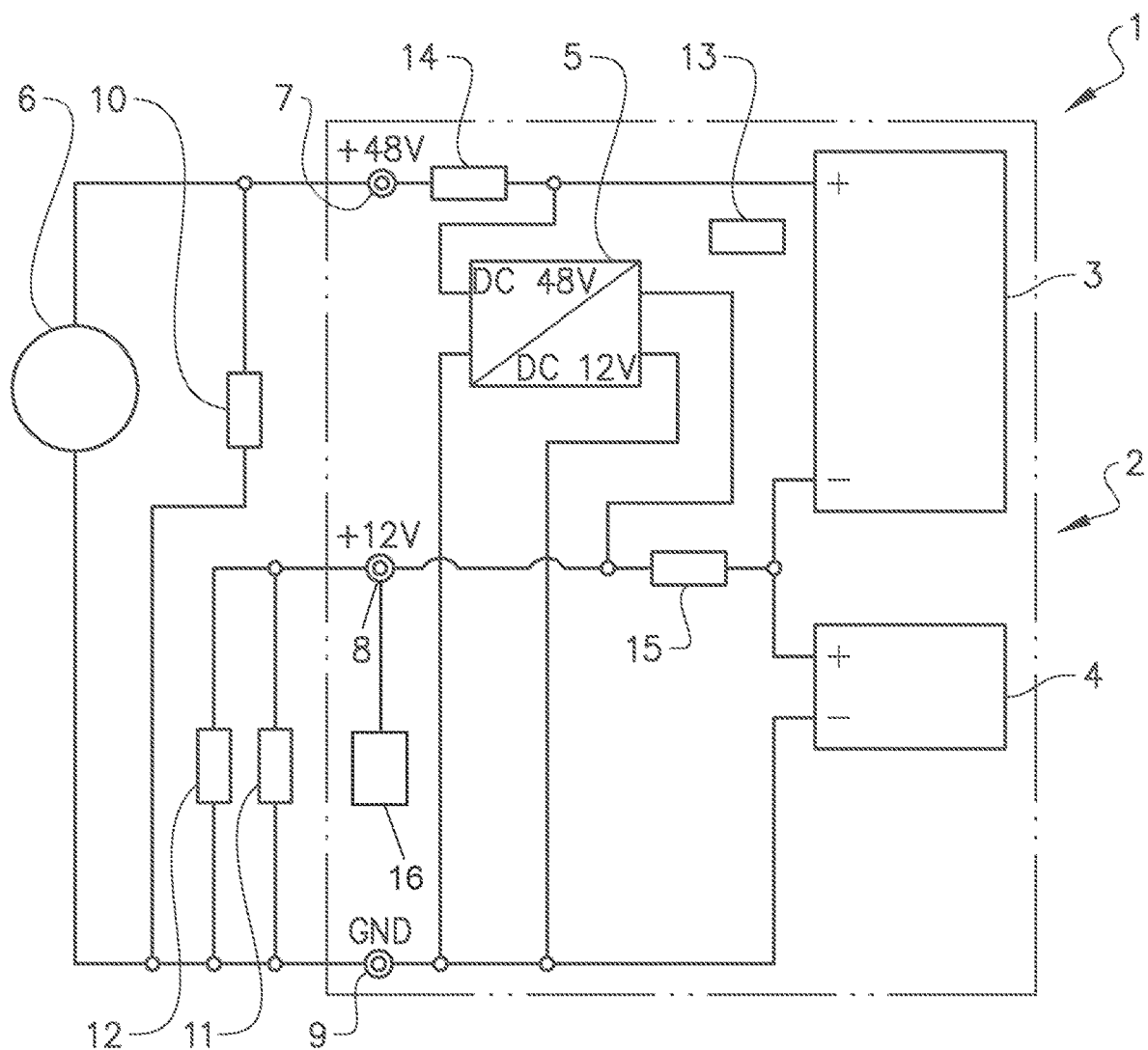
FIG. 1 shows a schematic voltage supply unit according to the disclosure.

FIG. 1 shows a schematic voltage supply unit 1 connected to a first load 10, a second load 11 and an electric machine 6. The voltage supply unit 1 comprises a first output 7 adapted to supply a first voltage to the first load 10. In this example, the first voltage will be 48 volts, but a higher voltage such as 400 volts could be used in other systems. The voltage supply unit further comprises a second output 8 adapted to supply a second, lower voltage to the second load 11. The second voltage will in this example be a standard 12 volt voltage. The voltage supply unit further comprises a ground terminal 9, which has a zero volt potential. The 12 volt voltage is obtained by a DC/DC converter 5 powered by the 48 volt voltage. The 12 volt voltage side of the DC/DC converter is connected to the second output 8 and the 48 volt voltage side of the DC/DC converter is connected to the first output 7. An electric machine 6 used as a generator for charging the battery is connected to the first output 7.

The voltage supply unit can thus supply two different output voltages, where the lower voltage is obtained from a DC/DC converter powered by the higher voltage. In this way, it is possible to provide two different supply voltages to the electrical system of a vehicle from a single battery. Most components of the vehicle will run on 12 volts, but some high power components, such as an electric machine functioning as a starter motor or a drive motor, will run on 48 volts in order to reduce the current and the power losses. The 48 volt load may be only the electric machine when used in a Kinetic Energy Recovery System (KERS) or may be several high voltage components, such as an electric machine and e.g. an Anti-lock Braking System (ABS). By using a DC/DC converter instead of a regular low voltage support battery, space and weight is reduced. Further, the 48 volt battery with the DC/DC converter can replace a regular 12 volt main battery.

The 48 volt battery 2 comprises a plurality of battery cells connected in series. A typical battery cell may have a nominal potential of 2.4 volts and 18 cells may be used for the battery. The battery comprises a first battery pack 3 and a second battery pack 4, where the second battery pack in this example constitutes the first six battery cells of the battery 2. The DC/DC converter 5 is adapted to charge the battery 2 by an external voltage supply 16 connected to the second output 8.

In normal conditions, the 48 volt output will supply the high voltage load 10 and the 12 volt output will supply the low voltage load 11 through the DC/DC converter. If an additional high power load 12 is connected to the 12 volt output, or if an additional high power load 12 connected to the 12 volt output is engaged, a transient current surge may have to be supplied to the load. This current surge may have a high peak value. Since the DC/DC converter needs some time to adapt to a change in the requested output, the DC/DC converter will not be able to regulate the output voltage fast enough when a transient high current peak is drawn from the 12 volt output. The DC/DC converter may also be designed such that it is not adapted to deliver such a high current peak. This may e.g. occur when the electric power steering motor starts. The high peak current may cause the low voltage output to drop below a predefined voltage security level, which may be e.g. 10.5 volts, before the DC/DC converter can regulate the output voltage. Below this voltage security level, the electronic control units of the vehicle may not function properly and may e.g. stop, reset or output false values. It is thus important that the output voltage is never below the voltage security level. A malfunction in an electronic control unit may e.g. corrupt the data bus communication of the vehicle.

The voltage supply unit will in this case connect the second battery pack 4 to the 12 volt output by using a second switch 15. The second switch may be a semiconductor switch with a low resistance. The second battery pack may be connected to the 12 volt output somewhat before the high power load is connected to the 12 volt output, or somewhat before the high power load connected to the 12 volt output is engaged, such that a steady state is obtained before the additional load 12 requires current. The second battery pack will be able to supply the required transient surge current and will function as a regular support battery. When the transient current has been delivered and the output of the DC/DC converter is stable, the second switch 15 can disconnect the second battery pack 4 from the 12 volt output.

Since the second battery pack will not be connected to the 12 volt output very often or for very long time periods, there is no problem with imbalance in state of charge between the first battery pack and the second battery pack. It is however of advantage to integrate a balancing function in the voltage supply unit that can charge the second battery pack when needed, such that the battery will function properly. This may e.g. be achieved by closing the second switch in order to charge the second battery pack from the low voltage output of the DC/DC converter.

The first battery pack and the second battery pack are connected in series, thus forming the 48 volt battery. In normal operation, the second battery pack is not connected to the 12 volt output. The second switch is thus normally open, and the 12 volt output is provided only by the DC/DC converter.

Output 7 is also provided with a first switch 14 which may be opened in emergency situations, e.g. when the total power consumption of the vehicle is higher than a specified value, in order to secure that there is enough power to supply the 12 volt load through the DC/DC converter from the 48 volt battery. In normal conditions, the first switch is closed. The first switch may be a semiconductor switch with a low resistance. The first load is in one example a starter engine used in a start/stop system of a vehicle. Other high voltage loads are also possible. The load may e.g. be an electric machine used as a help motor for a combustion engine, which is used to add additional power during accelerations. If the current consumption of the first load exceeds a predefined value, such that the power of the battery is not enough to supply the first load and to supply the second load through the DC/DC converter, the first switch may disconnect the first load or part of the first load. If the voltage of the first output falls below a predefined value, the DC/DC converter may not be able to output a stable voltage. The 12 volt output is prioritized since the security functions of the vehicle are supplied by the 12 volt output. It is thus important to secure a stable and reliable 12 volt voltage by the second output. The system is designed such that this situation will not occur in normal operation conditions, but may occur e.g. in cold weather conditions with a drained battery. The first switch 14 may also constitute a main switch for the high voltage output.

If the battery is completely drained, the voltage supply unit comprises a battery charging function that allows the 48 volt battery to be charged by an external 12 volt source. The function may be integrated in the DC/DC converter as a step-up converter, such that the 12 volt source may be connected to the second output. The 48 volt battery can now be charged through the DC/DC converter. This is e.g. helpful when a regular vehicle will help the vehicle to start through jumper cables.

When the vehicle is parked and the ignition is switched off, the voltage supply unit may also be used to supply the idle current needed for the components that are still active when the ignition is switched off. This may e.g. be the clock, alarm circuitry, remote control receiver and, at dark, the parking lights. In this case, the DC/DC converter is switched off and the second battery pack is connected to the second output. The idle current of the vehicle is relatively low and often below one ampere. By using the second battery pack to supply the idle current, the losses of the DC/DC converter can be avoided. Further, the efficiency of the DC/DC converter for such low currents is relatively low. When the second battery pack is drained or the charge of the second battery pack falls below a predefined level, the DC/DC converter is started such that the idle current can be supplied. It is also possible to charge the second battery pack through the DC/DC converter if the voltage of the second battery pack falls below a predefined voltage level.

The voltage supply unit comprises the battery and an electronic control unit 13. The electronic control unit may e.g. comprise the DC/DC converter, cell voltage monitoring, cell balancing circuitry, temperature measuring and monitoring, output current measuring, and CAN bus communication circuitry for communication with the electrical system of the vehicle. The electronic control unit may comprise a single printed circuit board mounted in the voltage supply unit.

It noted that the electronic control unit 13, voltage supply unit 1, and any other unit, control unit, controller, model, algorithm, device, feature, system, functionality, module, arrangement, or the like described herein may comprise and/or be implemented in or by one or more appropriately programmed processors (e.g., one or more microprocessors including central processing units (CPU)) and associated memory and/or storage, which may include data, firmware, operating system software, application software and/or any other suitable program, code or instructions executable by the processor(s) for controlling operation thereof, for controlling the various features and/or components described herein, for providing and/or controlling interaction and/or cooperation between the various features and/or components described herein, and/or for performing the particular algorithms represented by the various functions and/or operations described herein.

The voltage supply unit is adapted to be positioned at the front of a vehicle, in the engine compartment. Since the voltage supply unit is to be positioned in the engine compartment, the environment for the voltage supply unit will be relatively hot. Power losses in the battery and in the DC/DC converter will produce some additional heat. It is further of advantage to enclose the battery, the DC/DC converter and the electronic control unit in an air tight housing such that it is protected from environmental influences, such as dust and humidity. In order to hold the working temperature of the voltage supply unit at an acceptable level, the voltage supply unit is provided with an active air cooling system 19.

Figure 2:
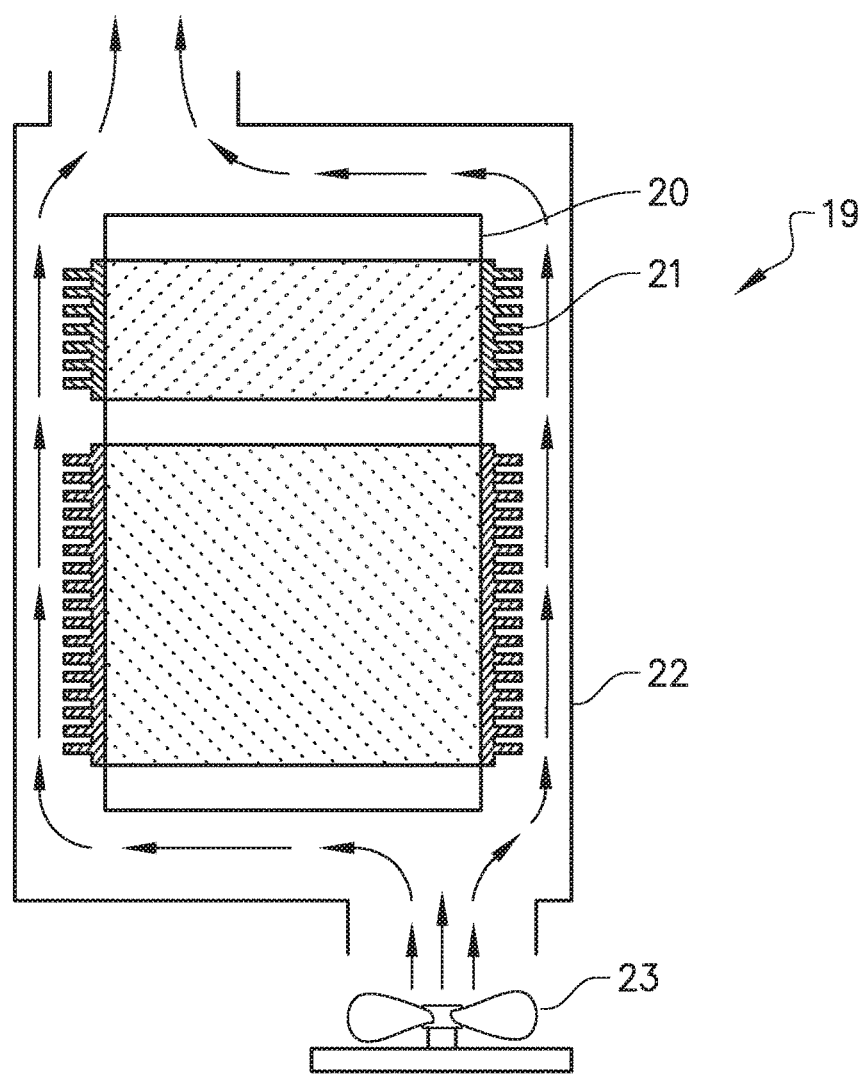
FIG. 2 shows a schematic cut view of a voltage supply unit according to the disclosure.

A cut view of an example of a voltage supply unit 1 is shown in FIG. 2. One purpose of the cooling system is to cool the active heat generating components of the voltage supply unit, which are mainly the battery and the DC/DC converter. Another purpose of the cooling system is to reduce the influence of the heat radiation from the engine. Since the voltage supply unit comprises not only the battery, but also electronics, it is of advantage to enclose the sensitive components in a protective housing 20 which protects the components from environmental influences. The housing limits the heat dissipation from the active components. The outer side of the housing is provided with heat sinks having cooling fins 21, which will improve the heat dissipation from the active components. The voltage supply unit is further provided with a cover 22 which encloses the housing of the voltage supply unit. An electric fan 23 creates an air flow through the voltage supply unit, between the cover and the housing. The air flow will remove heat from the heat sinks, which lowers the temperature of the active components.

In this way, it is possible to limit the temperature of the battery, which is the most heat sensitive component. The temperature of the air flow will be equal to the ambient temperature. The temperature of the battery may in this case, in a steady state, raise up to a temperature that is around 10 degrees Celsius above the ambient temperature. The air fan speed may be controlled in dependency of the ambient air temperature, and/or in dependency of the used current or power. Heat sinks may be provided on at least two sides of the housing of the voltage supply unit. This will enlarge the effective cooling area of the voltage supply unit. The air to the voltage supply unit may pass through an air filter in order to clean the air from particles. This will reduce contamination of the fins of the heat sinks, which may otherwise reduce the heat dissipation of the heat sinks.

Figure 3:
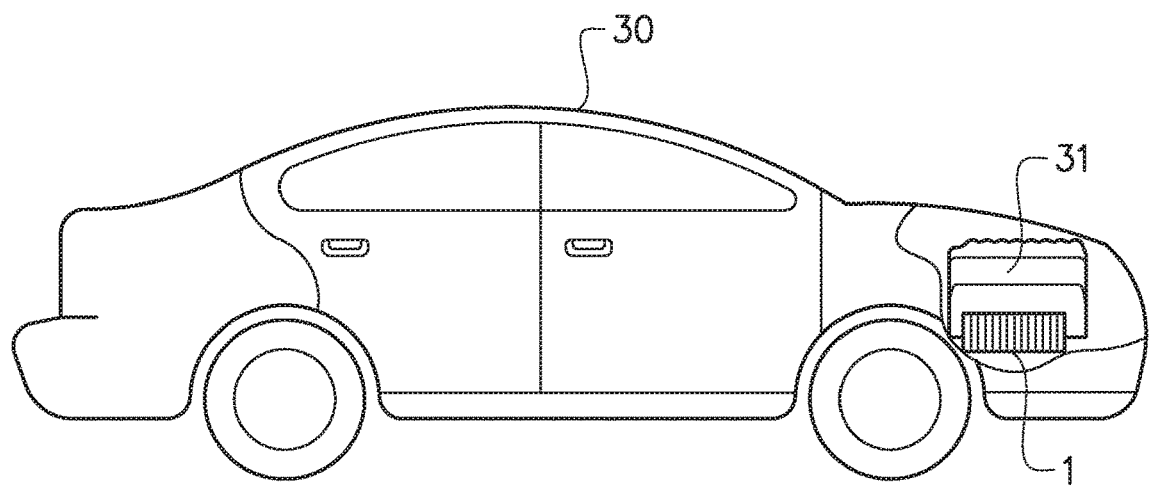
FIG. 3 shows a schematic vehicle comprising a voltage supply unit according to the disclosure.

FIG. 3 shows a vehicle 30 comprising a voltage supply unit 1 according to the disclosure. The voltage supply unit is positioned at the front of the vehicle, in the engine compartment, next to the combustion engine 31. By placing the voltage supply unit at the front of the vehicle, where most of the high load components are positioned, and where the generator of the vehicle is positioned, the cabling is simplified.

Figure 4:
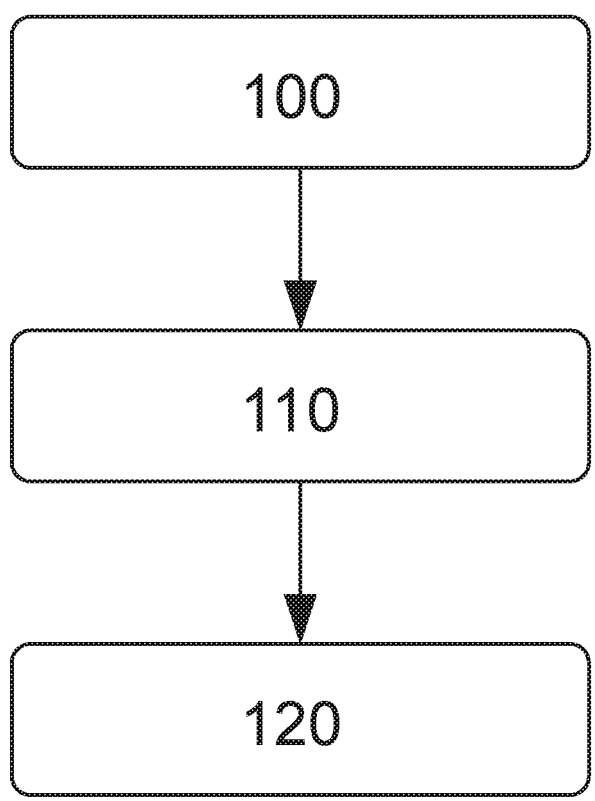
FIG. 4 shows a flow chart of an inventive method for supplying electric energy to a vehicle.

FIG. 4 shows a schematic flow chart of the method for supplying electric energy to an electric system of a vehicle. The method is performed during use of the vehicle. A hybrid vehicle may be charged when the vehicle is parked, e.g. at an evening or night, with an external grid connected to the voltage supply unit. The method steps may be performed by a computer program, computer code, computer executable instructions, or a computer program product or storage medium storing a computer program, computer code, or computer executable instructions. The computer program, computer code, computer executable instructions, or computer product or storage medium may be contained and run in the electronic control unit 13 of the vehicle or the voltage supply unit.

In step 100, a first voltage is supplied to a first load connected to a first output from a battery, and a second voltage is supplied to a second load connected to a second output from a DC/DC converter connected to the battery. In the shown example, the first voltage is 48 volts and the second voltage is 12 volts, but other voltages are also possible, e.g. 36 volts and 12 volts or 400 volts and 12 volts. The first voltage is supplied from a 48 volts battery, and the second voltage is supplied from a DC/DC converter powered by the 48 volts battery. By using a DC/DC converter for the lower voltage, there is no need to use a separate low voltage battery. The 48 volt output supplies some high voltage components, such as a starter motor, a drive motor or an active suspension. The 12 volt output supplies the regular vehicle system, e.g. dashboard, displays, lamps, etc.

In step 110, a second battery pack is connected to the second output in parallel with the DC/DC converter. The voltage of the second battery pack is the same as the output of the DC/DC converter, and is in the shown example 12 volts. The second battery pack is connected to the second output when an additional load is connected to the second output. The additional load is a load that requires a high start current, which cannot be delivered by the DC/DC converter. The additional load may e.g. be a servo motor or the valves in a brake system. The second battery pack may be connected to the second output before the additional load is connected to the second output or before the additional load is activated. It is also possible to connect the second output at the same time as the additional load is connected to the second output or at the same time as the additional load is activated.

By connecting a battery pack to the second output, the required peak current can be delivered by the battery pack. If such a high peak current was to be drawn from solely the DC/DC converter, the output voltage from the DC/DC converter could drop below a predefined security level.

In step 120, the second battery pack is disconnected from the second output. The second battery pack should not be connected to the second output more than necessary. The purpose of the second battery pack is to provide the peak current that is required by the additional load. When the additional load is in a steady state, the DC/DC converter will supply the steady state current.

REFERENCE SIGNS

1: Voltage supply unit
2: Battery
3: First battery pack
4: Second battery pack
5: DC/DC converter
6: Electric machine
7: First output
8: Second output
9: Ground
10: First load
11: Second load
12: Additional load
13: Electronic control unit
14: First switch
15: Second switch
20: Housing
21: Heat sink with fins
22: Cover
23: Fan
30: Vehicle
31: Combustion engine The disclosure is not to be regarded as being limited to the embodiments described above, a number of additional variants and modifications being possible within the scope of the subsequent patent claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A voltage supply unit for a vehicle, the voltage supply unit comprising:
    a first output configured to supply a first voltage to a first load; and
    a second output configured to supply a second voltage to a second load, wherein the second voltage is obtainable by a DC/DC converter configured to receive input from the first voltage, where a first terminal voltage side of the DC/DC converter is connected to the second output and a second terminal voltage side of the DC/DC converter is connected to the first output, the first terminal voltage being lower than the second terminal voltage;

a bettery comprising a first battery pack and a second battery pack connected in series, where an output voltage of the battery equals the first voltage and the output voltage of the second battery pack equals the second voltage; and a second switch adapted to connect the second battery pack to the second output, together with the first terminal voltae side of the DC/DC converter to provide parrallel current paths to the second output, in response to a predefined additional load connected to the second output;

wherein the DC/DC converter is adapted to charge the second battery pack in response to a ratio between a state of charge of the second battery pack and a state of charge of the first battery pack being lower than a predefined amount;

wherein, in response to the vehicle being parked and an ignition of the vehicle switched off, and the output voltage of the second battery pack being higher than a predefined voltage level, the DC/DC converter is switched off and the second battery pack is conected to the second output.

2. The voltage supply unit according to claim 1 further compising a first switch adapted to disconnect the first load from the first output in response to a current delivered by the second output that exceeds a predefined limit.

3. The voltage supply unit according to claim 1 wherein the DC/DC converter is adapted to charge the battery by an external voltage supply connected to the second output.

4. The voltage supply unit according to claim 1 wherein the battery, the DC/DC converter, and a control unit of the voltage supply unit are comprised in an air tight housing.

5. The voltage supply unit according to claim 4 further comprising an air cooling system.

6. The voltage supply unit according to claim 5 furher comprising an outer shell which encloses the air tight housing of the voltage supply unit, wherein the air tight housing is provided with cooling fins.

7. The voltage supply unit according to claim 5 wherein the air cooling system comprises a fan.

8. A vehicle comprises the voltage supply unit of claim 1.

9. The vehicle of claim 8 wherein the vehicle is a hybrid vehicle.

10. A method for supplying electric energy to an electric system of a vehicle, the method comprising:

supplying a first voltage to a first load connected to a first output of a battery;

supplying a second voltage to a second load connected to a second output of a DC/DC converter, the DC/DC converter connected to the first output of the battery;

connecting a second battery pack, comprised in the battery, to the second output in response to a predefined additional load being connected to the second output;

charging the second battery pack using the DC/DC converter in response to a ratio between a state of charge of the second battery pack and a state of charge of the first battery pack being lower than a predefined amount; and switching off the DC/DC converter and connecting the second battery pack to the second output, in response to the vehicle being parked and an ignition of the vehicle switched off, and an output voltage of the second battery pack being higher than a predefined voltage level.

11. A non-transitory computer readable medium having stored computer executable instructions for use in supplying electric energy to an electric system of a vehicle, the instructions for execution by a processor and memory to:

supply a first voltage to a first load connected to a first output of a battery;

supply a second voltage to a second load connected to a second output of a DC/DC converter, the DC/DC converter connected to the first output of the battery;

connect a second battery pack, comprised in the battery, to the second output in response to a predefined additional load being connected to the second output;

charge the second battery pack using the DC/DC converter in response to a ratio between a state of charge of the second battery pack and a state of charge of the first battery pack being lower than a predefined amount; and switch off the DC/DC converter and connect the second battery pack to the second output, in response to the vehicle being parked and an ignition of the vehicle switched off, and an output voltage of the second battery pack being higher than a predefined voltage level.

* * * * *